Patented Mar. 31, 1936

2,035,955

UNITED STATES PATENT OFFICE 2,035,955

PROCESS FOR THE PRODUCTION OF FERRO-CHROMIUM FREE OF CARBON

Antonius Foss, Oslo, Norway, assignor to Norsk Hydro-Elektrisk Kvaelstofaktieselskab, Oslo, Norway No Drawing. Application February 28, 1934, Serial No. 713,423. In Norway April 26, 1933

4 Claims. (Cl. 75—127)

My invention relates to the production of ferro-chromium and more especially to a process for the production of ferro-chromium free of carbon. When producing ferro-chromium that is poor in carbon, the method generally employed is to refine ordinary ferro-chromium containing carbon by melting it in the presence of certain substances which have the effect of oxidizing the carbon and eliminating it in the form of carbon oxide.

A more or less complete elimination of the carbon is thus attained, but, at the same time, other impurities are introduced instead. Besides this, the process is very elaborate and extremely expensive.

I have now discovered that it is possible to produce pure ferro-chromium that is free of carbon, by employing the following method:

Nitride of chromium is mixed together with iron that is free of carbon, preferably in the form of iron sponge or ferrum reductum. This mixture is thereupon melted either in an indifferent or in a reductive atmosphere, preferably pure hydrogen, whereby the nitrogen is expelled.

As nitride of chromium as well as iron can now be produced in a very pure quality, and more especially free of carbon, it will be perceived that by employing this method, ferro-chromium that is free of carbon can be obtained direct and a product is obtained not containing any other impurities.

Instead of immediately heating the mixture to melting point, it is often advantageous first to heat the mixture until it sinters, thereupon raising the temperature to such a degree that the substance melts.

My invention can also be carried out as follows: The nitride of chromium is first heated by itself, whereby most of the nitrogen is expelled. Thereupon the mixing with iron and the melting of the product is effected.

It is mentioned above that the process takes place either in an indifferent or in a reductive atmosphere. It is clear that the process can also be carried out in vacuum, whereby the expelling of the nitrogen is facilitated, and products that are free of gas are obtained.

What I claim is:

1. Process for the production of ferro-chromium free of carbon, consisting in first heating nitride of chromium to a temperature sufficient to expel most of its nitrogen content, then mixing the remaining product with iron and lastly melting the mixture.

2. Process as defined in claim 1 in which the expulsion of the nitrogen and the melting of the mixture are carried out in a non-oxidizing environment.

3. Process as defined in claim 1 in which the expulsion of the nitrogen and the melting of the mixture are carried out in a reducing atmosphere.

4. Process as defined in claim 1 in which the expulsion of the nitrogen and the melting of the mixture are carried out at least in part in a partial vacuum.

ANTONIUS FOSS.